(12) United States Patent
Yamaguchi

(10) Patent No.: US 7,535,956 B2
(45) Date of Patent: May 19, 2009

(54) ADAPTIVE EQUALIZER CIRCUIT

(75) Inventor: Hisakatsu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 601 days.

(21) Appl. No.: 11/187,804

(22) Filed: Jul. 25, 2005

(65) Prior Publication Data

US 2006/0176946 A1    Aug. 10, 2006

(30) Foreign Application Priority Data

Feb. 10, 2005   (JP) .............................. 2005-035171

(51) Int. Cl.
*H03K 5/159* (2006.01)
(52) U.S. Cl. .................................... 375/232; 375/229
(58) Field of Classification Search .......... 375/229–234
See application file for complete search history.

(56) References Cited

U.S. PATENT DOCUMENTS 4,730,343 A    3/1988    Kanemasa

2005/0193318 A1 *   9/2005   Okumura et al. ............ 714/795

OTHER PUBLICATIONS

Jan W.M. Bergmans, "Digital Baseband Transmission and Recording", 1996, p. 412-420, Kluwer Academic Publication.
Jan W.M. Bergmans, "Digital Baseband Transmission and Recording," Klywer Academic Publishers, 1996, Adaptive Reception, Chapter 8, pages: title page, publication page, 400-413.

* cited by examiner

*Primary Examiner*—David C Payne
*Assistant Examiner*—Leon Flores
(74) *Attorney, Agent, or Firm*—Fujitsu Patent Center

(57) ABSTRACT

An adaptive equalizer circuit equipped by a control unit for controlling an equalizer circuit, comprising a detection unit for detecting an identity of a preset data pattern with a data pattern as a result of data judgment for an output of the equalizer circuit, a monitor unit for sequentially monitoring an input to a gain amplifier for each of a plurality of filters constituting the equalizer circuit and an output thereof every time the identity detection unit detects an identity, and a unit for making the control unit operate an adaptive equalization control by providing the control unit with the monitoring result, thereby making it possible to track a great change in a characteristic of transmission line without using a matrix responding to the characteristic of the transmission line or a convolution operation by using the matrix.

13 Claims, 14 Drawing Sheets

TEMPERATURE −20°C

TEMPERATURE +25°C

TEMPERATURE +85°C

ADAPTIVE EQUALIZER CIRCUIT

CROSS-REFERENCE TO RELATED APPLICATIONS

This application is based upon and claims the benefit of priority from the prior Japanese Patent Application No. 2005-035171 filed on Feb. 10, 2005, the entire contents of which are incorporated herein by reference.

BACKGROUND OF THE INVENTION

1. Field of the Invention

The present invention relates to an equalization method for a signal such as communication data, in particular to an adaptive equalization method for a data receiver circuit engaged in a data exchange between boards or chassis mounted with LSI for example and to an adaptive equalizer circuit for reducing a distortion of received data influenced by a transmission distortion, or a disturbance, occurring in a transmission path.

2. Description of the Related Art

When transmitting and receiving data by way of a transmission line with a large loss, an equalizer circuit is generally used at a receiving end in order to compensate for the loss. FIG. 1 describes a concept of adaptive equalization. As shown by FIG. 1, when an eye pattern in an output signal coming out of transmission line transforms with a temperature change in the transmission line for example, an equalizer circuit comprised at the receiving end performs an adaptive equalization for securing a data amplitude of the received signal, thereby making it possible to secure a sufficient data amplitude for enabling a data judgment circuit to judge the data. When exchanging data by way of a transmission line with a large loss, such as a low cost transmission line, the adaptive equalization for carrying out an adjustment of data amplitude according to the characteristic of the transmission line is an indispensable technique.

FIG. 2 shows a configuration of an analog derivative equalizer as a representative example of equalizer circuit. This equalizer circuit comprises a one time derivative element (s) and a two times derivative element ($s^2$) in order to emphasize a change in input signals. In the adaptive equalization, it is necessary to secure a sufficient magnitude of data amplitude as an input to the data judgment circuit by adjusting the coefficients A0, A1 and A2 of respective filters constituting the equalizer circuit. In other words, the adaptive equalization is a technique to secure a receiver signal amplitude so as to satisfy a bit error rate required at a receiving end by adjusting the coefficients of the respective filters.

In FIG. 2, a control for accomplishing an adaptive equalization will be such that there is no correlation between an input amplitude Fi (i=0, 1, 2) and an amplitude error e, where an output of equalizer circuit 101 being comprised between a transmission line 100 and data judgment circuit 102, that is, a data amplitude of an input to the data judgment circuit 102 is y, an expected amplitude after an equalization is d, and an amplitude error is then e=d−y.

FIG. 3 shows an impulse response in the analog derivative equalizer shown by FIG. 2. An input to the equalizer circuit 101, that is, an output from the transmission line 100 has a mild rise and a large inter-signal interference (ISI) component. Comparably, an output of the equalizer circuit 101 has a steep rise with the change in signal being emphasized and also a smaller ISI.

FIG. 4 shows a block diagram of conventional example configuration of adaptive equalization method. In FIG. 4, a transmitted data from a transmission circuit 105 by way of a transmission line 100 is received by a receiver circuit 106. The inside of the receiver circuit 106 comprises an equalizer circuit 101 which is equivalent to the analog derivative equalizer shown by FIG. 2, a data judgment circuit 102, a de-multiplexer (1 to N) & buffer 107 for providing one input (of N bits) to an adaptive equalizer control circuit 110 while receiving an output of the data judgment circuit 102 and an AD converter 108 for AD-converting the output of the equalizer circuit 101, that is, the input to the data judgment circuit 102.

And the adaptive equalizer circuit control 110 is configured for carrying out a convolution operation by using the outputs of a matrix 111, which is the matrix reflecting a characteristic of each filter constituting the transmission line 100 and that of equalizer circuit 101, and de-multiplexer & buffer 107; predicting the signal amplitudes F0, F1 and F2 at the input to a gain amplifier for each filter which is an internal node of the equalizer circuit 101; computing the coefficients A0, A1 and A2 of the respective filters of the equalizer circuit 101 by using the aforementioned result of prediction and amplitude error e; and having each coefficient adjusted.

The inside of the adaptive equalizer control circuit 110 comprises a convolution operation unit 112; a selector 113 for selecting one bit of N-bit output from the de-multiplexer & buffer 107; an amplifier 114; a subtracter 115 for calculating an amplitude error "e" which is expressed as e=d−y, where a predicted amplitude "d" as the output of the amplifier 114, and the input data amplitude "y" to the data judgment circuit 102 as the output of the AD converter 108; three multipliers for operating each filter coefficient included in the equalizer circuit 101 by using the above described amplitude error "e", signal amplitudes F0, F1 and F2; three of step size parameters ssp as a variable for determining a convergence time constant of adaptive equalization loop; and three integrators.

Note that, in FIG. 4, a calculation of amplitude error e needs to know where a data relating to the output of the AD converter 108 is located in the output of the de-multiplexer & buffer 107. The buffer of the de-multiplexer & buffer 107 is for locating the data. The locating on the side of receiver circuit 106 is not necessarily required, but the assumption here is done thereby just for convenience. Since the locating is done by a known technique and therefore a detailed description thereof is omitted herein. Furthermore in FIG. 4, another assumption is that the adaptive equalizer control circuit 110 is constituted by a logic circuit, for which the AD converter 108 is equipped on the side of the receiver circuit 106.

FIG. 5A, FIG. 5B and FIG. 5C shows a result of simulation indicating an arithmetic logical operation (simply "operation" hereinafter, unless otherwise noted) of adaptive equalization loop, where the predicted amplitude d of the input data to the data judgment circuit 102 is set at ±0.1Vpp. Despite that the temperature at the transmission line varies from minus 20 to plus 85 degrees Celsius, one can understand from FIG. 5A, FIG. 5B and FIG. 5C that the average of input data amplitudes is approximately ±0.1Vpp, equal to the predicted amplitude, hence securing an adequate data amplitude. Understanding also is that the coefficients A0, A1 and A2 of the respective filters constituting the equalizer circuit respectively converges around 5000 ns as shown by the uppermost charts and that the square average of the amplitude error has become smaller as shown in the middle.

Such an adaptive equalization method using the analog derivative equalizer is seen in the following reference document in which FIG. 8, 39 are applicable to the conventional configuration shown by FIG. 4 herein.

[Non-patent document 1] Jan W. M. Bergmans: DIGITAL BASE BAND TRANSMISSION AND RECORDING, 8.5, Kluwer Academic Publishers (1996)

The conventional configuration shown by FIG. 4, however, has been faced with the problem that there is a limitation in a range of tracking the characteristic changes due to temperature and/or secular changes of a transmission line because the content of the matrix, as the matrix reflecting the characteristics of transmission line and respective filters constituting the equalizer circuit, is fixed. Particularly, if a characteristic of transmission line changes greatly, a use of given matrix will no longer be able to find appropriate values of the coefficients A0, A1 and A2 of the respective filters constituting the equalizer circuit. Such has been a problem.

In such events, the conventional configuration requires a change in the matrix, that is, needs to prepare specific matrices in response to temperature and/or secular changes of the transmission line, and uses a suitable matrix for each range of temperature for example. A preparation of such a plurality of matrices and a grasp of tracking ranges for the characteristic of the transmission line for each matrix demand a series of works in need of vast amount of man-hours, hence becoming a large obstacle in an actual operation of an equalizer circuit. Such has been the problem.

SUMMARY OF THE INVENTION

The challenge of the present invention is to provide an adaptive equalizer circuit capable of tracking even if a great change in a characteristic of transmission line occurs, through directly monitoring an inputted amplitude into a gain amplifier, which has been predicted by a convolution operation (N.B.: "operation" (or "operate") means an arithmetic logical operation herein, unless otherwise noted), for each filter constituting an equalizer circuit, without using a matrix reflecting the characteristic of the transmission line or a convolution operation based on the matrix.

According to the present invention, an adaptive equalizer circuit equipped by a control unit for controlling an equalizer circuit comprises a detection unit for detecting an identity of a preset data pattern with a data pattern as a result of data judgment for an output of the equalizer circuit; a monitor unit for sequentially monitoring an input to a gain amplifier for each of a plurality of filters constituting the equalizer circuit and an output thereof, every time the identity detection unit detects an identity; and a unit for making the control unit operate an adaptive equalization control by providing the control unit with a monitoring result.

The present invention makes it possible to secure an adequate data amplitude enabling a data judgment if a characteristic of transmission line changes greatly, thereby providing an adaptive equalizer as a high performance equalizer. An execution of control operation for adaptive equalization every time an identity with a preset data pattern is detected makes it possible to reduce a circuit size.

DESCRIPTION OF THE PREFERRED EMBODIMENTS

Figure 6:
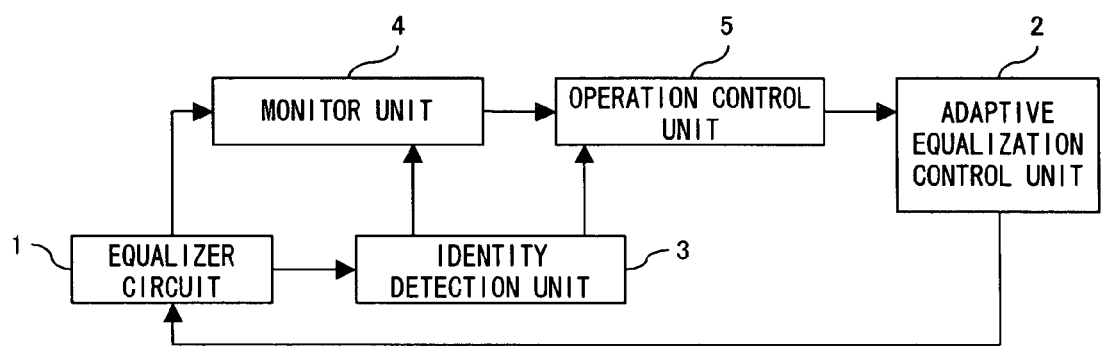
FIG. 6 is the fundamental comprisal block diagram of adaptive equalization circuit according to the present invention.

FIG. 6 is the fundamental comprisal block diagram of an adaptive equalization circuit according to the present invention. FIG. 6 is the fundamental comprisal block diagram of the adaptive equalization circuit, comprising an adaptive equalization control unit 2 for adaptively controlling an equalizer circuit 1 which equalizes a signal as an object of equalization ("equalization object signal" hereinafter). The adaptive equalization circuit comprises at least an identity detection unit 3, a monitor unit 4 and an operation control unit 5.

The identity detection unit 3 is disposed for detecting an identity of a preset data pattern with a data pattern as a result of data judgment for an output of the equalizer circuit, the monitor unit 4 is disposed for directly and sequentially monitoring an output of the equalizer circuit 1 and the inputs to a plurality of gain amplifiers for respective filters constituting the equalizer circuit 1, every time the identity detection unit 3 detects the aforementioned identity of the data pattern; and an operation control unit 5 is disposed for making the control unit operate an adaptive equalization control by providing adaptive equalization control unit 2 with a monitoring result at the time of the monitor unit 4 monitoring an output of the equalizer circuit 1 and inputs to the plurality of gain amplifiers.

In the present embodiment, the above described preset data pattern and the length thereof can be changed; an equalization object signal is a data receiving signal transmitted from the data transmitter; the adaptive equalization circuit is capable of carrying out an adaptive equalization for the aforementioned data receiving signal; the adaptive equalization control unit 2 is comprised by a logic circuit; and the monitor unit 4 may comprise an AD (analog/digital) converter.

Furthermore, in the present embodiment, the adaptive equalization circuit may further comprise a plurality of monitor result hold units for temporarily holding the respective monitor results obtained by the monitor unit 4, and the operation control unit 5 may comprise a switch unit for providing the adaptive equalization control unit 2 with the held data at the time of all the plurality of monitor result hold units holding the respective data.

Next, an adaptive equalization circuit according to the present invention comprises a plurality of storage units for storing respective input values to a plurality of gain amplifiers for respective filters constituting the equalizer circuit 1 vis-à-vis a preset data pattern, an identity detection unit for detecting an identity of the preset data pattern with a data pattern as a result of data judgment for an output of the equalizer circuit 1, and an operation control unit for making the adaptive equalization control unit 2 start an operation of adaptive equalization control by using a storage content of the plurality of storage units by providing a predicted amplitude for the control at the time of the identity detection unit detecting the aforementioned identity of data pattern.

In the adaptive equalization circuit of the present embodiment, the above described preset data pattern and the length thereof can be changed; an equalization object signal is a data receiving signal transmitted from the data transmitter; the adaptive equalization circuit is capable of carrying out an adaptive equalization for the aforementioned data receiving signal; the adaptive equalization control unit is comprised by a logic circuit; and the plurality of storage units is capable of storing respective input digital values for the above described gain amplifiers.

Furthermore, the adaptive equalization circuit according to the present invention, being the one comprising an adaptive equalization control unit for adaptively controlling an equalizer circuit which equalizes an equalization object signal, comprises a monitor unit for directly monitoring inputs to a plurality of gain amplifiers for respective filters constituting an equalizer circuit to provide the adaptive equalization control unit.

As described so far, an operation of adaptive equalization is carried out either by directly monitoring inputs to a plurality of gain amplifiers for respective filters constituting an equalizer circuit or by using a storage content of input to a gain amplifier vis-à-vis a preset data pattern, without using a matrix in response to the characteristics of a transmission line or filters constituting the equalizer circuit, or a convolution operation unit which predicts an input to again amplifier for each filter based on the matrix, according to the present invention.

Figure 7:
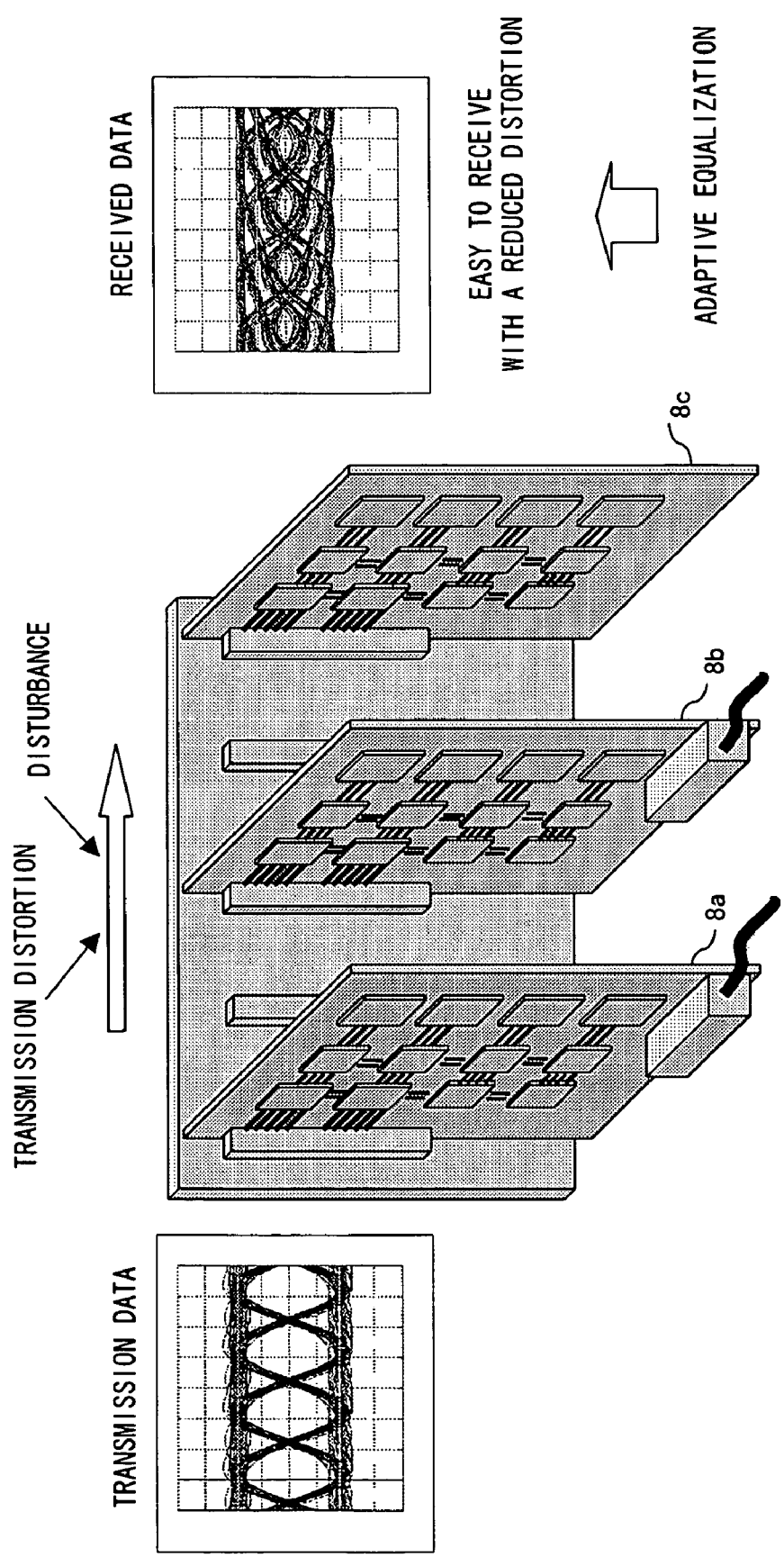
FIG. 7 describes a backplane transmission in which an adaptive equalization method of the present invention is used.

In the description of the present invention herein, while an adaptive equalization method for use in a data receiver circuit is chosen as a representative application field, a backplane transmission is one of such data transmission methods. FIG. 7 describes such a backplane transmission in which an adaptive equalization is required.

In FIG. 7, data is transmitted and received among boards 8a, 8b and 8c mounted with LSI for example. In such a backplane transmission, since a distortion occurs in a received data due to a transmission distortion or disturbance added to a transmitted data, resulting in being unable to reproduce an "eye" in the received data at the receiving end, it is therefore necessary to equalize so as to receive easily by reducing the distortion through an adaptive equalization. In such a backplane transmission, a cable length as transmission line is about one meter on the outside and the frequency is less than 10 GHz in most cases, but if the cable length becomes longer or the frequency increases to 10s (tens) of GHz, an equalization just by changing the above described matrices will become impossible, thus requiring a use of an adaptive equalization circuit as described in the following.

Figure 8:
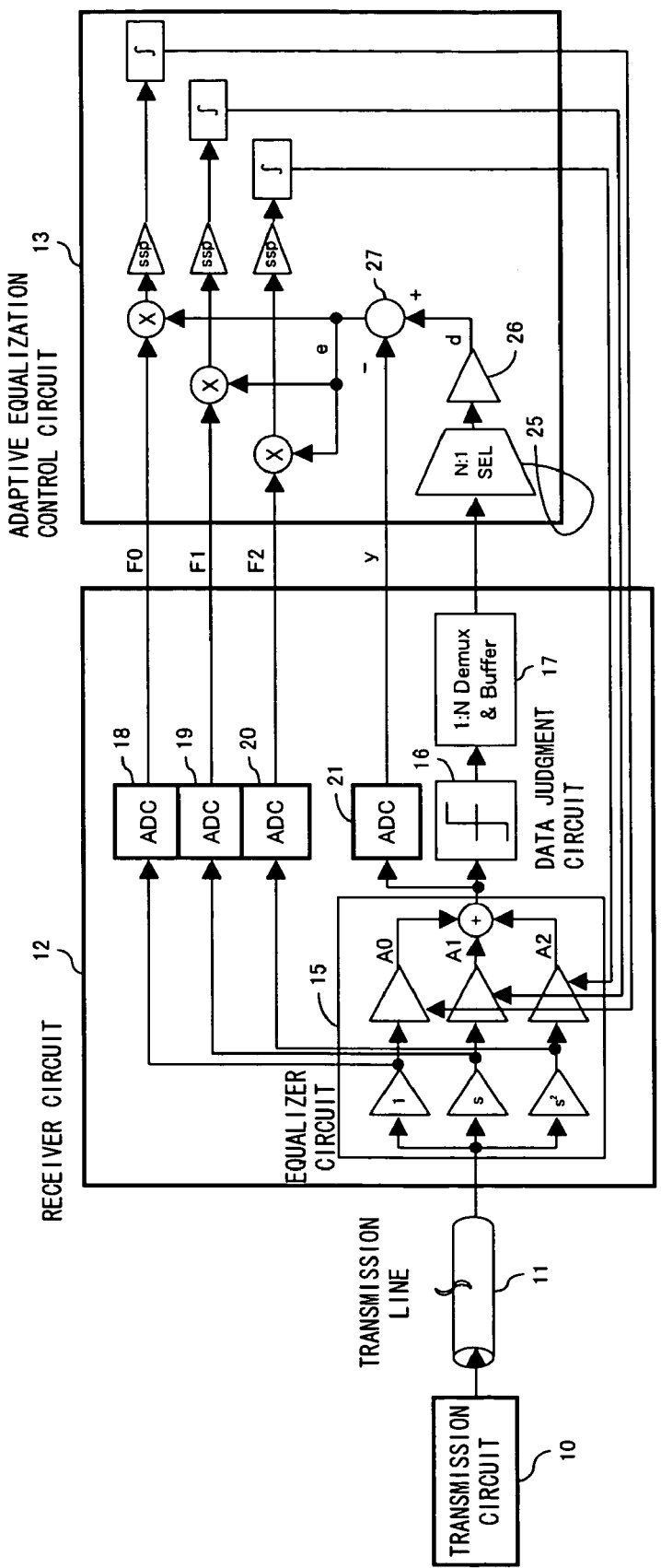
FIG. 8 is a comprisal block diagram of a first embodiment of adaptive equalization method according to the present invention.

FIG. 8 describes an adaptive equalization method of a first embodiment according to the present invention. As with the conventional configuration shown by FIG. 4, a transmitted data transmitted from a transmission circuit 10 by way of a transmission line 11 is received by a receiver circuit 12. An adaptive equalization control circuit 13 for adaptively controlling an equalizer circuit 15 with in the receiver circuit controls the filter coefficients A0, A1 and A2 of respective filters within the equalizer circuit 15 adaptively.

In the inside of receiver circuit 12, a data judgment unit 16, given an output of the equalizer circuit 15, judges a ±1 of data so as to give the judgment result to the adaptive equalization control circuit 13 by way of a de-multiplexer & buffer 17. And input values for respective nodes within the equalizer circuit 15, that is, for the input terminals of gain amplifiers for respective filters are given to the adaptive equalization control circuit 13 by way of three AD converters 18, 19 and 20. So will be the output of the equalizer circuit 15 given thereto by way of an AD converter 21.

On the side of the adaptive equalization control circuit 13, a selector 25 first selects one bit from among N bits of the output from the de-multiplexer & buffer 17 to give it to a subtracter 27 by way of an amplifier 26 as a predicted amplitude d. The subtracter 27 also receives an output data amplitude y out of the AD converter 21 so as to calculate the difference between d and y and gives it to three multipliers as the amplitude error e.

Meanwhile, the three multiplexers also receive outputs from three AD converters 18, 19 and 20, respectively. These three outputs correspond to the three outputs of the convolution operation unit 112 according to the conventional configuration shown by FIG. 4. As described for FIG. 4, the convolution operation unit 112 is configured to predict input values of gain amplifiers for respective filters as the internal nodes of the equalizer circuit 101 through a convolution operation by using the outputs of the matrix 111 and de-multiplexer & buffer 107, thereby outputting the F0, F1 and F2 from the convolution operation unit 112 as the predicted values.

Whereas, the present first embodiment is basically characterized as directly monitoring input values for the gain amplifiers for the respective filters as signals in the internal nodes of the equalizer circuit 15 by using the three AD converters 18, 19 and 20 to provide the adaptive equalization control circuit 13 with the F0, F1 and F2, without using a matrix or a convolution operation unit. Note here that the three AD converters 18, 19 and 20 correspond to a monitor unit noted in claim 10 of the present invention.

The adaptive equalization control circuit 13 averages the correlation result between the input values F0, F1 and F2 for the gain amplifiers of respective filters within the equalizer circuit and amplitude error e by an integration to output the coefficients A0, A1 and A2 of respective filters within the equalizer circuit 15.

In the first embodiment, the configuration is in strict accordance with the principle of adaptive equalization by using the four AD converters, hence requiring a plurality thereof in the inside of the receiver circuit 12 and being faced with a problem in terms of circuit size. Besides, there are three filters here, i.e., zeroth, first and second orders, constituting the equalizer circuit. However, there may be filters of more than second order being required depending on a characteristic of transmission line transmitting an equalization object signal, further requiring more AD converters.

The characteristic of transmission line 11 is expressed for instance by a bode plot on which an attenuation tends to be small in lower frequencies while it tends to become large with frequency. If an inclination of attenuation in high frequency region is about a −40 dB/dec, a filter may be corresponding to $s^2$ as shown by FIG. 8, that is, two times of differentiation, but if the inclination becomes about −60 dB/dec, then a filter corresponding to $s^3$, that is, three times the differentiation, will be required, further requiring more corresponding AD converters. Note here that the adaptive equalization control circuit 13 is basically comprised by a logic circuit according to the present embodiment and therefore the AD converters are used for carrying out a digital processing, but the AD converter will not be required if the adaptive equalization control is done by using an analog signal.

Figure 9:
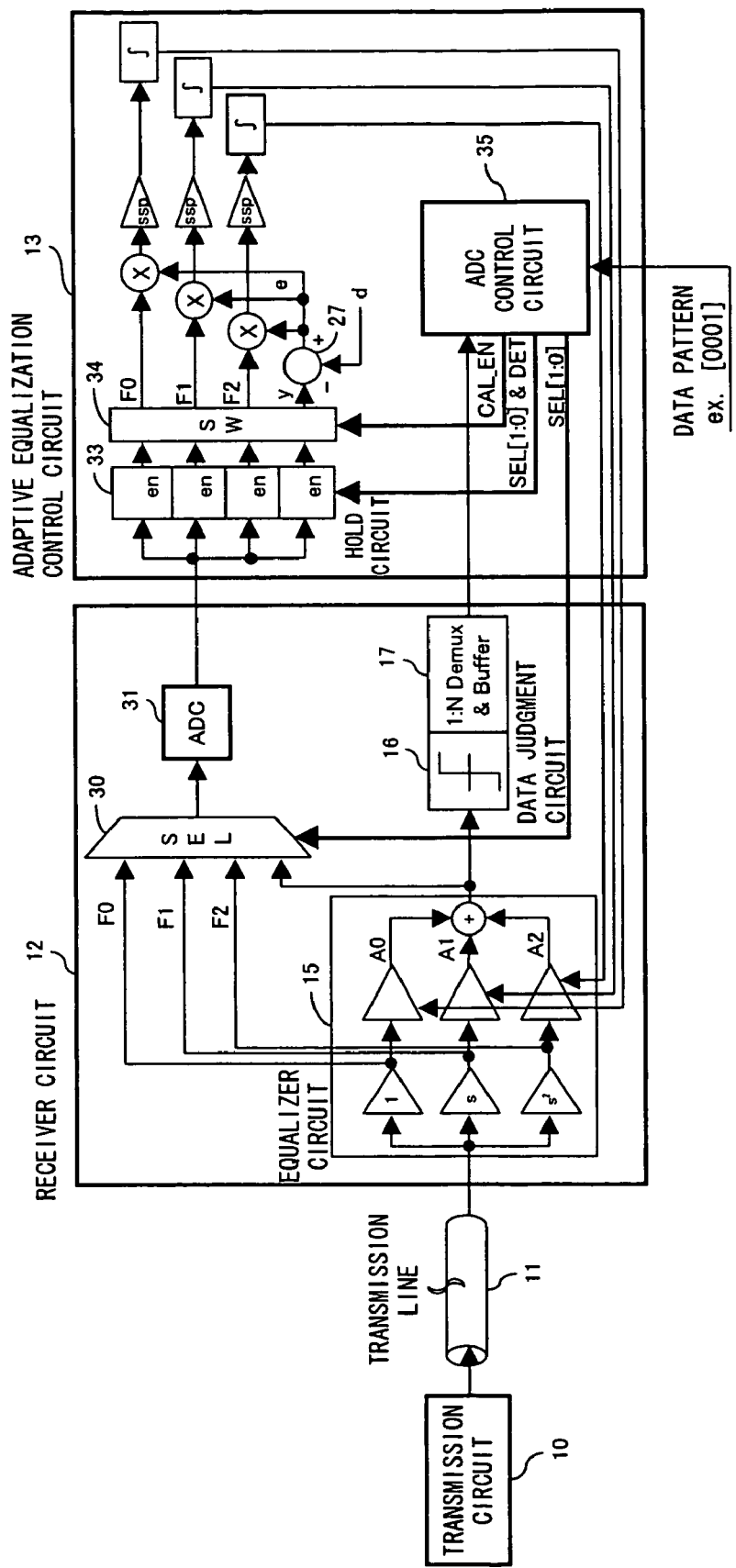
FIG. 9 is a comprisal block diagram of a second embodiment of adaptive equalization method.

FIG. 9 describes a second embodiment of adaptive equalization method. In the second embodiment, the fundamental characteristic is to reduce the number of AD converters from four used in the first embodiment to one by interleaving (i.e., serial operation). That is, only one AD converter 31 is equipped within the receiver circuit 12, with a selector 30 being comprised for receiving input values for the gain amplifiers of the respective filters constituting the equalizer circuit 15 and output therefrom at the front stage of the AD converter 31.

Figure 5:
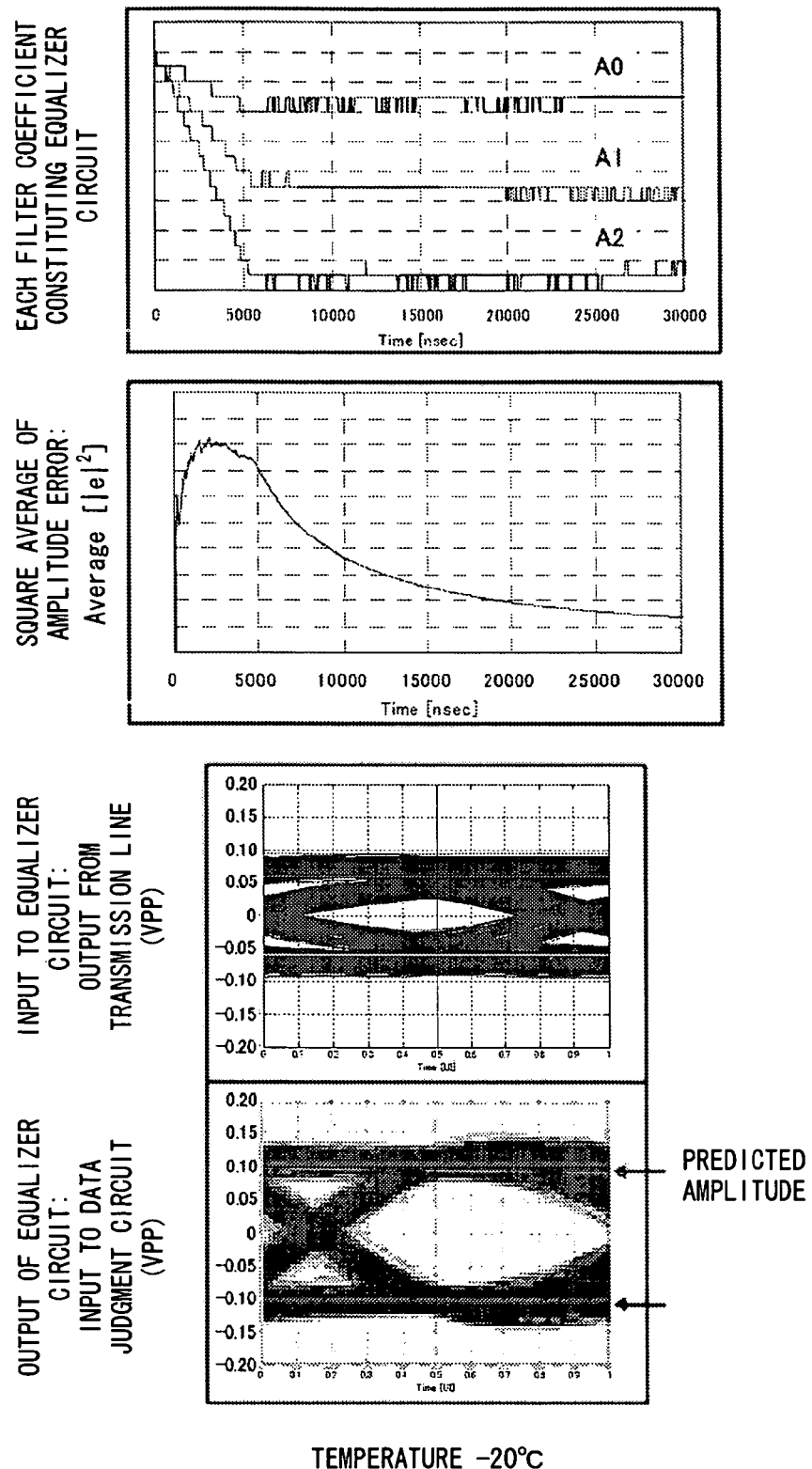
FIG. 5A shows a result of simulation indicating an operation of adaptive equalization at minus 20 degrees Celsius.
FIG. 5B shows a result of simulation indicating an operation of adaptive equalization at 25 degrees Celsius.
FIG. 5C shows a result of simulation indicating an operation of adaptive equalization at 85 degrees Celsius.
Figure 5B:
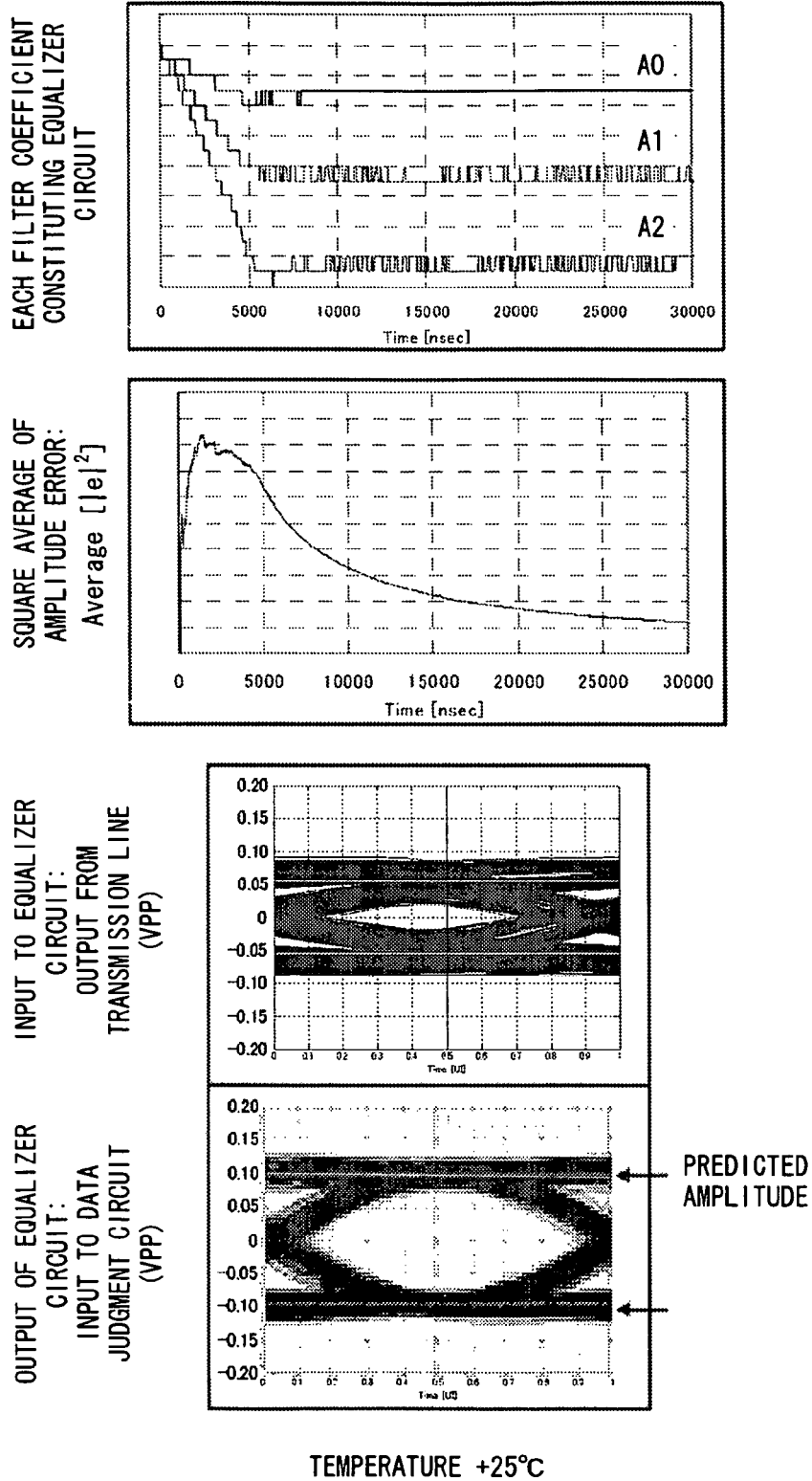
Figure 5:
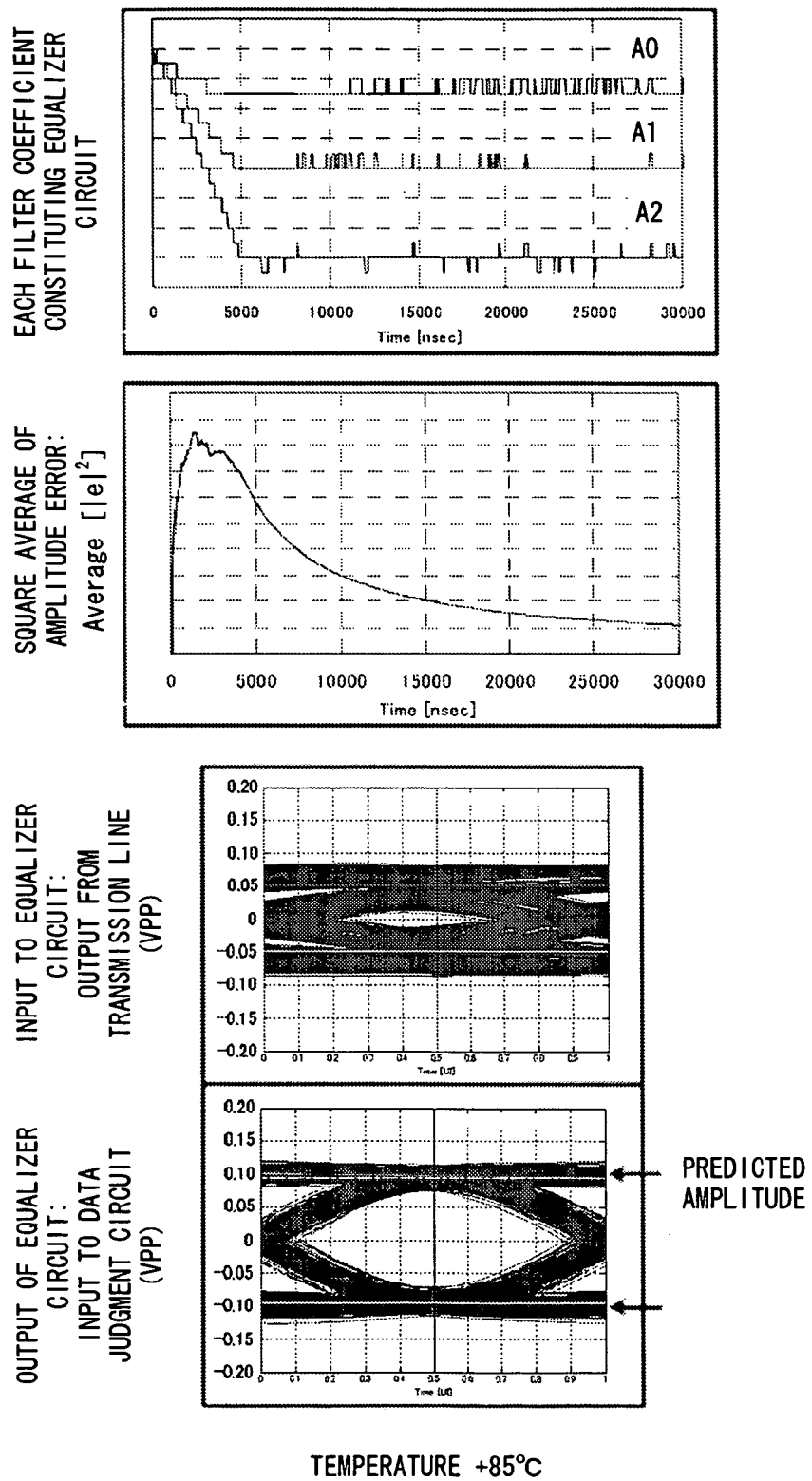

The inside of the adaptive equalization control circuit 13 comprises a hold circuit 33 for temporarily holding outputs of the AD converter 31; a switch 34 for giving the held data to three multiplier circuits and a subtracter 27 as the F0, F1, F2 and output y of the equalizer circuit 15 as in the case of FIG. 8; and an AD converter control circuit 35 for controlling switching the selector 30, a data input to the hold circuit 33 and an operation of the switch 34. Incidentally, a predicted amplitude d to be given to the subtracter 27 is assumed to be known as a value corresponding to a later described set pattern so as to give a value as described for FIG. 5A, FIG. 5B and FIG. 5C for example, that is, a digital value corresponding to a ±0.1V.

In the second embodiment, the configuration is such that a result of judging an output of the equalizer circuit 15 by the data judgment unit 16 is compared with a preset data pattern, e.g., "0001"; the selector 30 is switched at the time of the preset data pattern being detected within the N-bit output from the de-multiplexer & buffer 17 as a judgment result, the output result of the selector 30 is converted to a digital data by the AD converter 31; and the values F0, F1, F2 and y will be held in the aforementioned order from the top by the hold circuit 33.

Here, the description is about setting a data pattern such as "0001". It is possible to consider an influence of past events as the characteristic of the transmission line 11, that is, how much the influence of data transmitted in the past still remains as a measure of characteristic. In other words, it is beneficial to look at some bits of past data to see whether an influence of the past data still remains or not. In the data pattern "0001", a "0" corresponds to minus 1, and, if there is an influence of minus 1 remaining, a value corresponding to the last "1" will become very small. In order to make the value larger, a large equalization operation will be required. Conversely, if the aforementioned value is close to "1", then only a small equalization operation is required. This is the reason why the "0001" is selected for an example data pattern.

As described above, the hold circuit 33 holds the digital data corresponding to F0, F1, F2 and y every time a preset data pattern is detected, and the switch 34 gives these data to three multipliers and the subtracter 27, respectively, when these data are all stored, thereby carrying out a control operation of adaptive equalization, that is, the operations of coefficients A0, A1 and A2 of the respective filters within the equalizer circuit 15 in the present second embodiment.

Figure 10:
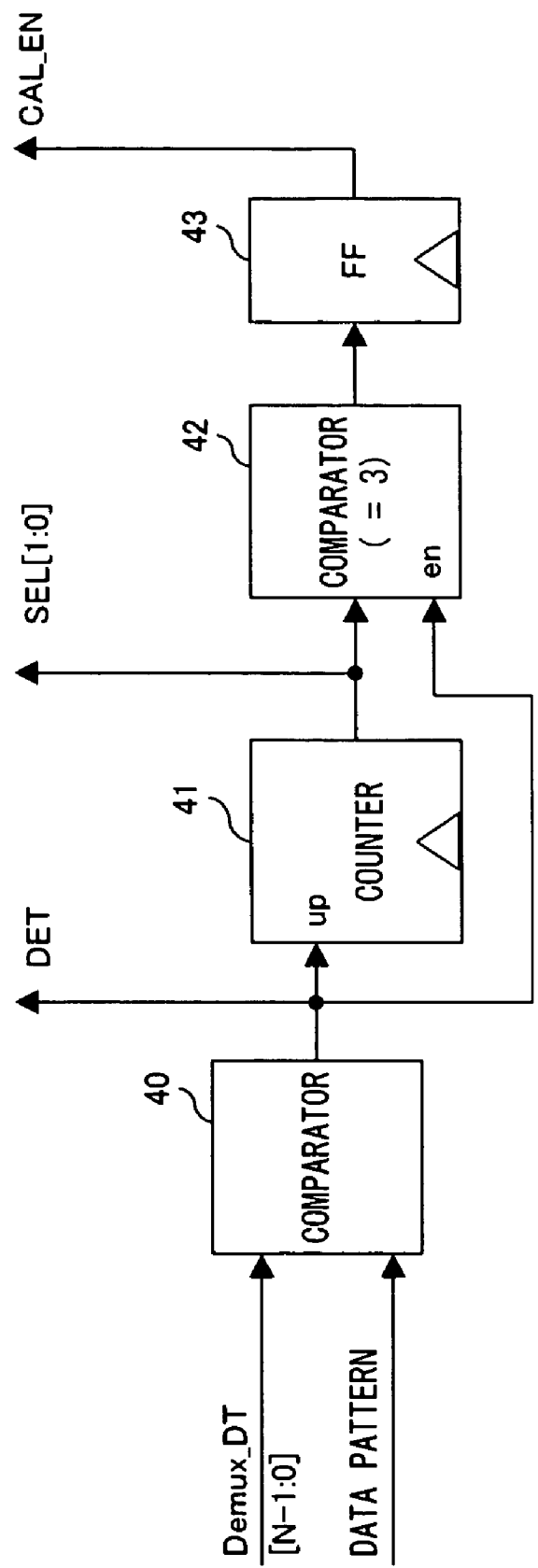
FIG. 10 is an example comprisal of AD converter control circuit shown by FIG. 9.
Figure 11:
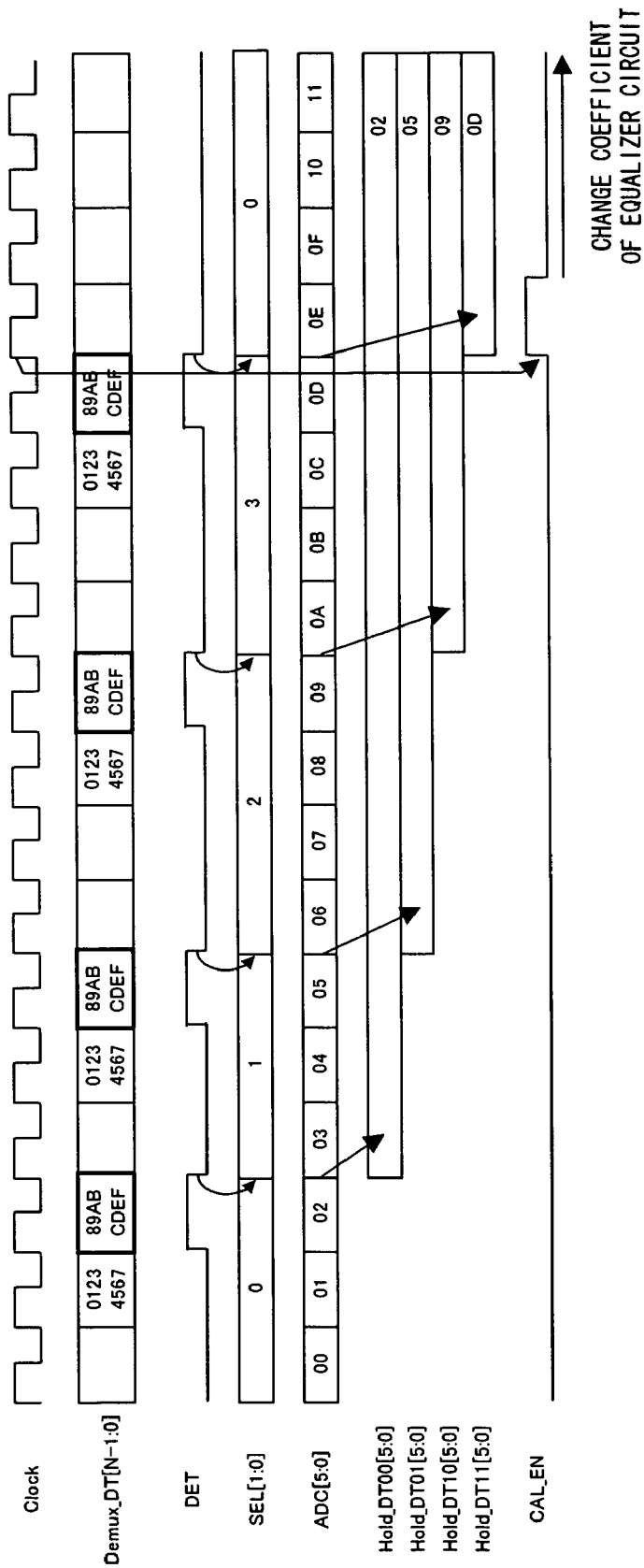
FIG. 11 shows an operating time chart down to the point of equalizer circuit coefficient change operation in the second embodiment.

FIG. 10 is an example comprisal of the AD converter control circuit 35 shown by FIG. 9; and FIG. 11 shows an operating time chart down to the point of starting operation for adaptive equalization control in the second embodiment.

In FIG. 10, N-bit data Demux_DT outputted from the de-multiplexer & buffer 17 is compared with a preset data pattern, e.g., "0001", by the comparator 40 and a count number in a counter 41 is counted up and the output of the comparator 40 is outputted as a DET signal if an identity is detected. The output of the comparator 40 is given to a comparator 42 as an enable signal, the comparator 42 compares a 2-bit SEL signal, as the output of the counter 41, with "3" and, if both are identical, outputs "1" as the comparison result to an FF43, and then the output thereof is given to the switch 34 as a calculation enable signal. Among these signals, the SEL signal outputted from the counter 41 becomes a selection control signal for the selector 30; the SEL signal is given to the hold circuit 33 as hold enable signal when a signal corresponding to the logical product of the DET signal outputted from the comparator 40 and the SEL signal outputted from the counter 41, that is, a DET signal is "1"; and as the value of SEL signal increases the output from the AD converter 31 will be held by the hold circuit 33 from the upper part thereof toward the lower part in an orderly fashion.

Note here that, in claim 1 of the present invention, an identity detection unit corresponds to the comparator 40; a monitor unit corresponds to the selector 30 and AD converter 31; an operation control unit corresponds to the comparator 42, FF43 and switch 34; while in claim 5, a plurality of monitor result hold units correspond to the hold circuit 33.

In the time chart shown by FIG. 11, a 32-bit data, Demux_DT [N−1: 0] (N=32) as the output from the de-multiplexer & buffer 17 is expressed by 4-bit blocks of data in the hexadecimal notation. In the 32-bit data, it is determined hardware-wise and fixed as to where the AD converter 31 monitors.

The comparator 40 is configured to compare the past 4-bit, including the one at the time of analog signal sampling, with the preset data pattern, e.g., "0001". Here, an "8" in the hexadecimal notation is a "1000" in the binary notation, and when looking at the "1000" backwards, it looks like an order of "0001". Accordingly, at the time of detecting a pattern corresponding to "8" in the hexadecimal notation among the inputted 32-bit de-multiplex data, the comparator 40 will output the DET signal as a comparison result. At this point in time, the output of the counter 41 is incremented, the value of SEL signal is incremented every time an "8" exists in a de-multiplex data and at the same time the output of the AD converter 31 is held by the hold circuit 33. Here, the output of the AD converter 31 is 6-bit, but it may of course be 8-bit for instance.

When first detecting an "8" in a de-multiplex data, the value of the SEL signal becomes "1", prompting the hold circuit 33 to hold the output of the AD converter 31, i.e., "02" here, at the upper most part, that is, at a part corresponding to F0. When detecting an "8" next time in a de-multiplex data, the value of the SEL signal becomes "2", making the hold circuit 33 hold "05", as the output of the AD converter 31, at the second part from the top thereof, i.e., at a part corresponding to F1. Furthermore, when detecting an "8" existing in a de-multiplex data, the value of the SEL signal becomes "3", making the hold circuit 33 hold "09" outputted from the AD converter 31 at the third part from the top, that is, at a part corresponding to F2.

When detecting the next "8" in a de-multiplex data, the counter 41 overflows, clearing the outputted SEL signal to "0". At this point in time, the hold circuit 33 holds the output of the AD converter 31, "0D" at the lowest part, that is at a part corresponding to y, and at this point in time the FF (flip flop) 43 takes in "1" as the output from the comparator 42 at a clock rise edge which is identical with a fall edge of the DET, with the value being given to the switch 34 as a calculation enable signal and the data which has been held by the hold circuit 33 being outputted for an equalizer circuit coefficient change operation by way of the switch 34.

As described above, the second embodiment is capable of reducing the number of AD converters and making the circuit size more compact by the AD converter monitoring sequentially at the time of detecting the preset data pattern.

Figure 12:
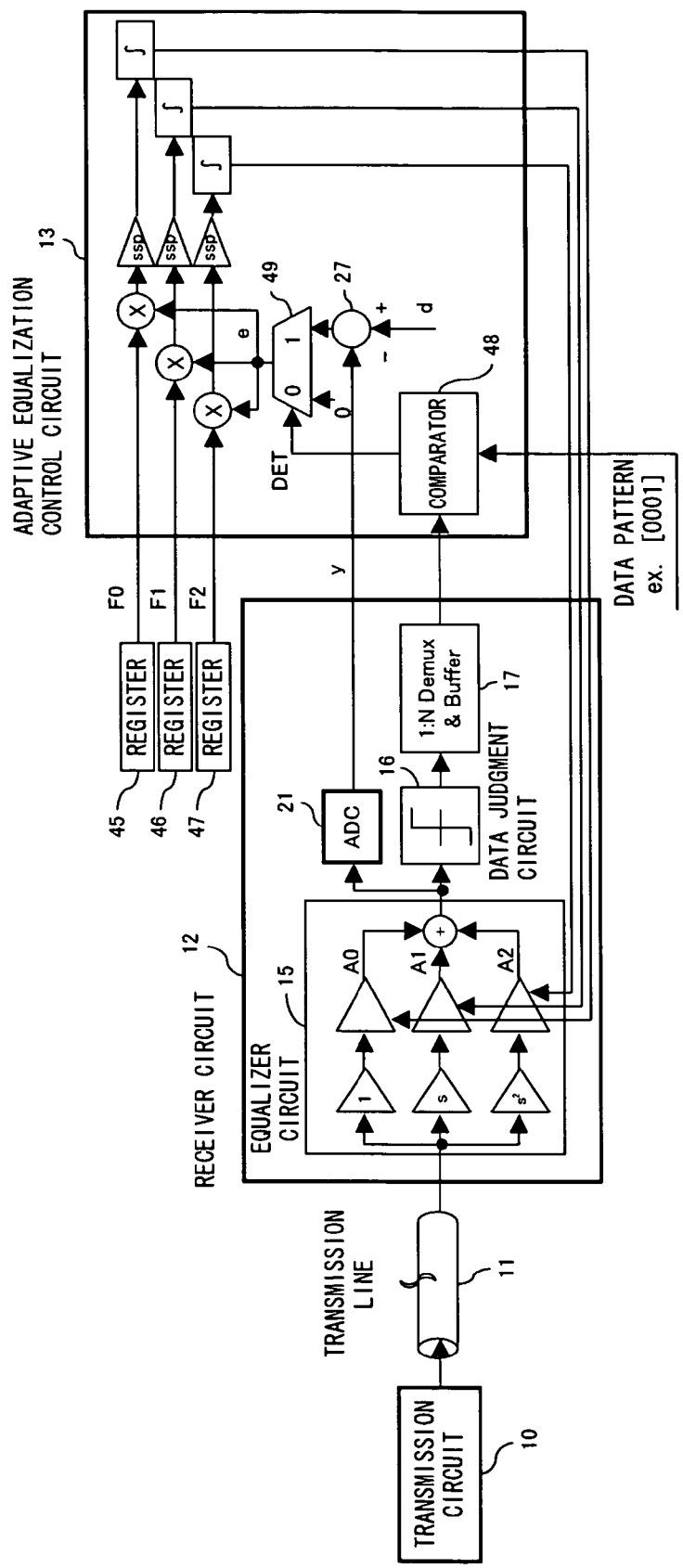
FIG. 12 is a comprisal block diagram of a third embodiment of adaptive equalization method.

FIG. 12 is a comprisal block diagram of a third embodiment of adaptive equalization method. The third embodiment has a coefficient change operation carried out for the equalizer circuit at the time of detecting a preset data pattern, e.g., "0001", in an output from the de-multiplexer & buffer 17, as with the second embodiment. Whereas, the third embodiment concentrates on simplifying a circuit, staying with the same circuit comprisal as the above described conventional comprisal shown by FIG. 4 for the receiver circuit 12, and modifying an adaptive equalization control circuit in order to accomplish an adaptive equalization control in need of no matrix or convolute operation unit.

To that end, the third embodiment furnishes with three registers 45, 46 and 47 for providing the adaptive equalization control circuit 13 with a signal value of internal nodes of the equalizer circuit 15, that is, input values to the gain amplifiers for the respective filters; a comparator 48 for comparing between a preset data pattern within the adaptive equalization control circuit 13, e.g., "0001", and an output of the de-multiplexer & buffer 17; and a selector 49 for outputting a result of the subtracter 27 subtracting an output y of the equalizer circuit 15, which is outputted from the AD converter 21, from the predicted amplitude d as an amplitude error e when the value of the DET signal outputted from the comparator 48 is "1" and for outputting "0" as the amplitude error e when the value of the DET signal is "0".

Here, the values of F0, F1 and F2 stored in the registers 45, 46 and 47, respectively, are amplitude values inputted to the gain amplifiers for the respective filters as signal values of internal nodes within the equalizer circuit 15 vis-à-vis the preset data pattern, e.g., "0001", and these values are in the outside of renewal loop of the respective filter coefficients A0, A1 and A2 carried out by the adaptive equalization control circuit 13, and therefore are possible to calculate easily by a simulation for instance. It is possible to operate an equalizer circuit coefficient change by storing values calculated by a simulation in advance in the three registers 45, 46 and 47 as the values F0, F1 and F2, respectively. Also, it is possible to give a digital value corresponding to a ±0.1V for instance for a value of predicted amplitude d, as with the case of the second embodiment.

Note here that a plurality of storage units correspond to the registers 45, 46 and 47, an identity detection unit corresponds to the comparator 48 and an operation control unit corresponds to the selector 49, all in claim 6 herein.

The third embodiment is configured to carry out a coefficient change operation of equalizer circuit when detecting a preset data pattern, e.g., "0001", once in an output of de-multiplexer & buffer 17. Contrarily in the second embodiment shown by FIG. 9, an equalizer circuit coefficient change operation is carried out after detecting the preset pattern four times.

That is, in the second embodiment shown by FIG. 9, the number of operations for an equalizer circuit coefficient change is less than the case of the third embodiment shown by FIG. 12, leading to a reduction of power consumption on one hand, but a convergence of adaptive equalization loop being delayed, an operation of adaptive equalization undone and making the time of holding a state of equalizer circuit longer, on the other hand.

Such a convergence of adaptive equalization loop naturally changes with a length of preset data pattern and its content. For instance, setting the length of data pattern as 2 bits and its content as "01", for example, makes the probability of such a data pattern existing in an output of de-multiplexer & buffer 17 high, hence the convergence of adaptive equalization loop becoming fast. While a longer data pattern is expected to improve an equalization characteristic per se, a longer period for a convergence will probably result. In this context, a length of 4 bits is deemed to be appropriate. Note that another simulation is necessary to change the data of F0 through F2 to be stored by the registers 45 through 47 if changing a data pattern for the third embodiment shown by FIG. 12.

Figure 1:
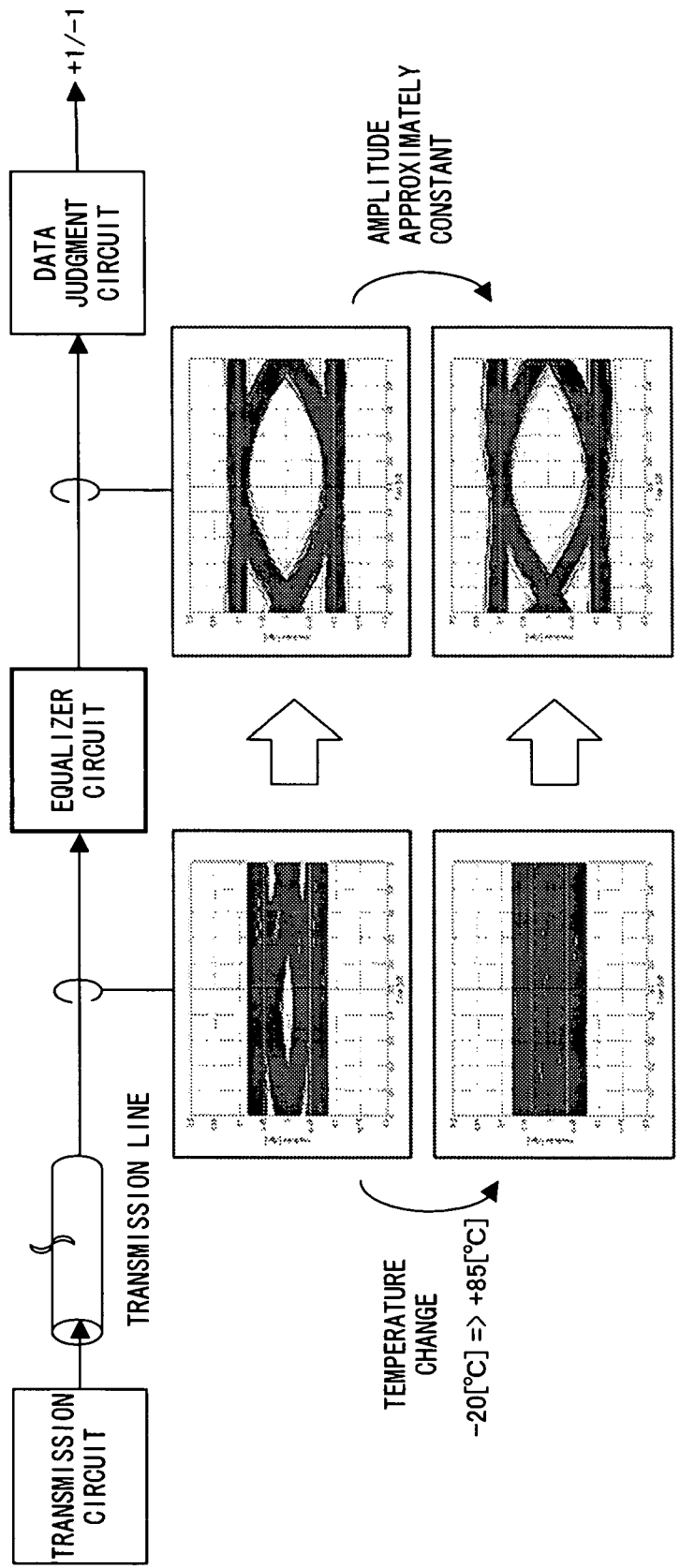
FIG. 1 describes a concept of adaptive equalization.
Figure 2:
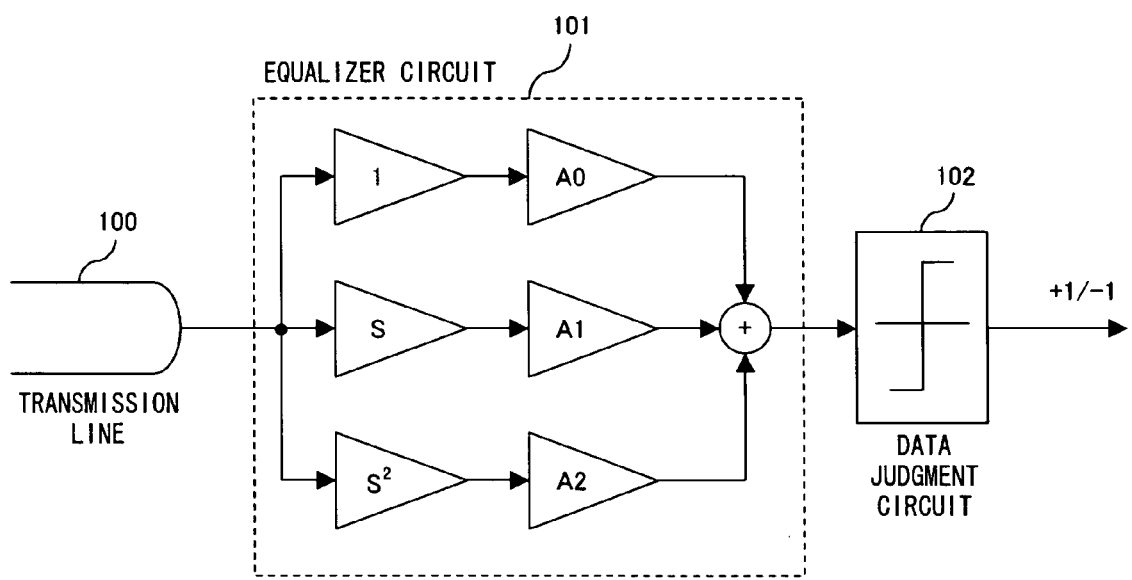
FIG. 2 shows a configuration of analog derivative equalizer.
Figure 3:
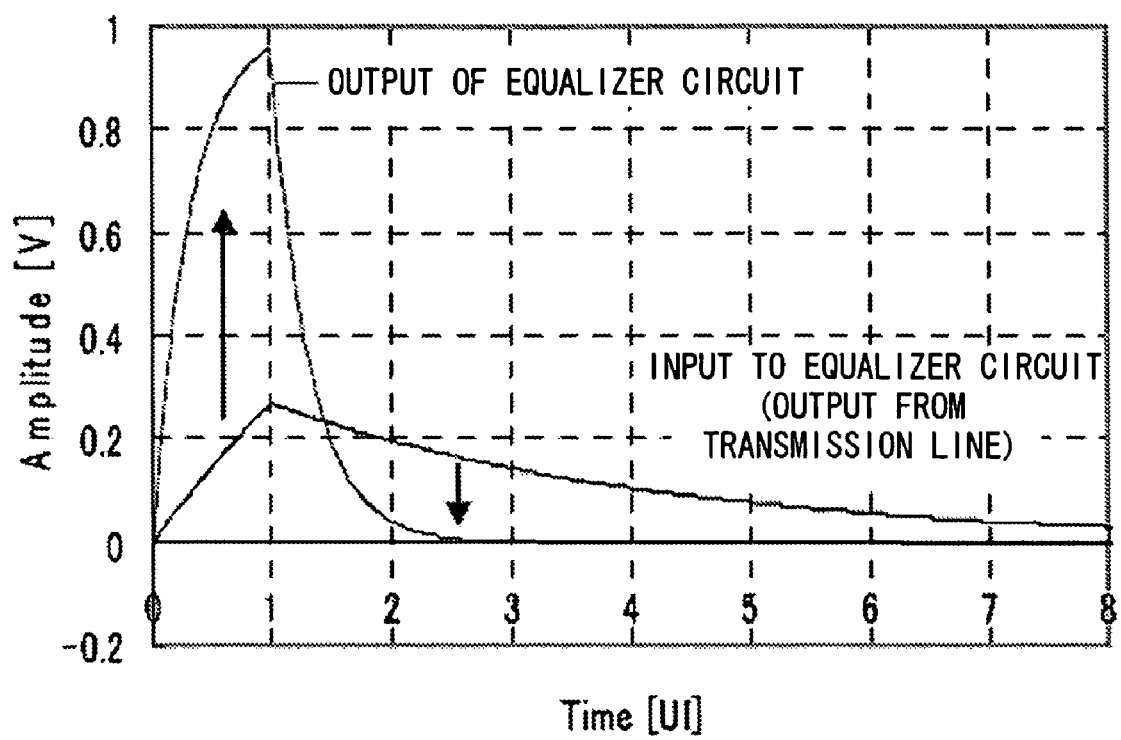
FIG. 3 shows an impulse response in an analog derivative equalizer.
Figure 4:
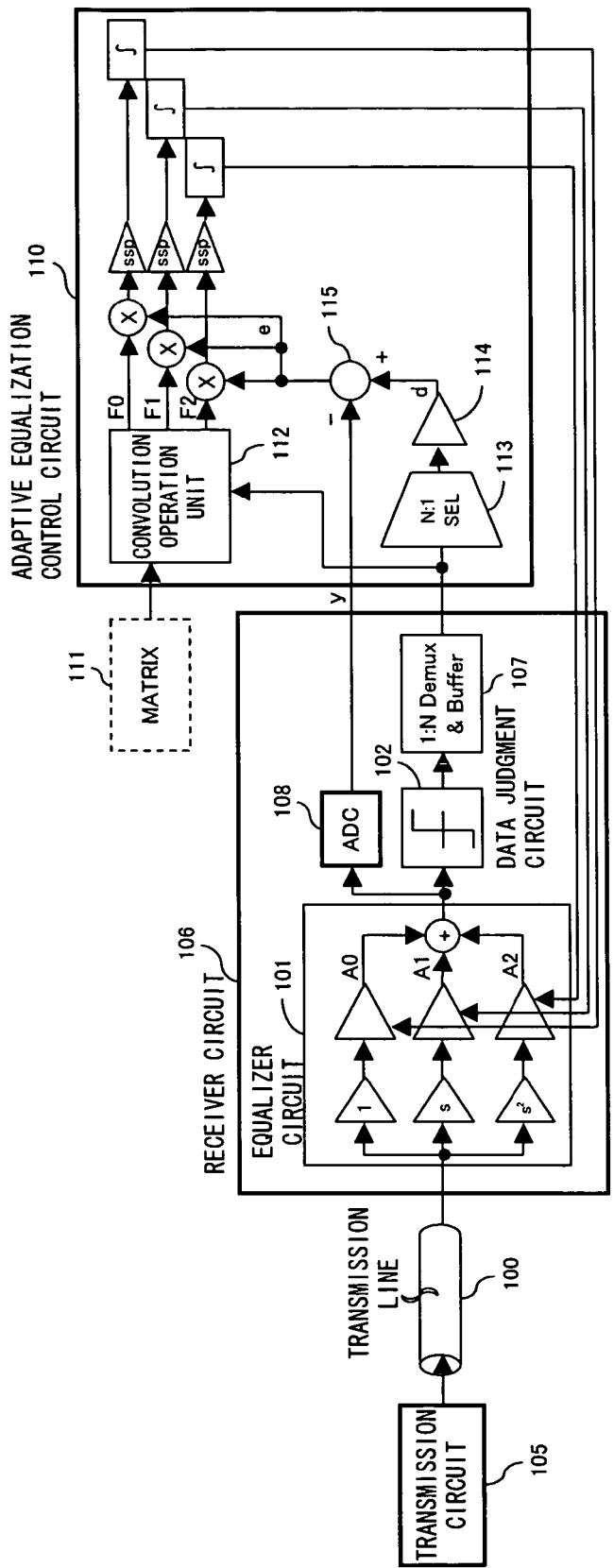
FIG. 4 shows a block diagram of conventional example configuration of adaptive equalization method.

In the third embodiment shown by FIG. 12, the comprisal of the receiver circuit 12 is the same as the conventional comprisal shown by FIG. 4, requiring no matrix or convolution operation unit which engages a heavy load of processing for an adaptive equalization control circuit, while making it possible to reuse an adaptive equalization circuit of conventional comprisal relatively easily just going through a modification thereof by furnishing with the comparator 48 and selector 49 in place of the selector 113 and amplifier 114. In this context, the third embodiment is practically very important. Such advantage is gained by fixing a data pattern.

As described as above, the present invention makes it possible to secure an adequate performance of adaptive equalization, that is, an appropriate data amplitude as the output of an equalizer circuit for a data judgment, compared to the conventional technique using a matrix and a convolution operation even if the characteristic of a transmission line changes greatly, by directly monitoring input amplitudes of the gain amplifiers for the respective filters constituting the equalizer circuit. Also it makes it possible to reuse an adaptive equalization circuit of the conventional comprisal, with a reduced circuit size, by changing configuration to carry out a coefficient change operation for the equalizer circuit only when detecting an identity with a preset data pattern, thereby modifying a part of the conventional adaptive equalization circuit.

What is claimed is:

1. An adaptive equalization circuit equipped by an adaptive equalization control unit for controlling an equalizer circuit which equalizes an equalization object signal, comprising:
    an identity detection unit for detecting an identity between a preset data pattern and a data pattern output from the equalizer circuit;
    a monitor unit for sequentially monitoring an output of the equalizer circuit and inputs to a plurality of gain amplifiers included by the equalizer circuit, every time the identity detection unit detects the identity between the preset data pattern and the data pattern; and
    an operation control unit for making the adaptive equalization control unit operate an adaptive equalization control by providing the adaptive equalization control unit with the result of monitoring,
    wherein the result of monitoring are the output of the equalizer circuit and the inputs to a plurality of gain amplifiers,
    wherein the monitor unit circuit includes a plurality of first analog/digital converters each of which receives the corresponding input to a plurality of gain amplifiers.

2. The adaptive equalization circuit according to claim 1, wherein said preset data pattern and a length thereof are variable.

3. The adaptive equalization circuit according to claim 1, wherein said equalization object signal is a data receiving signal transmitted by a data transmitter and said adaptive equalization circuit carries out an adaptive equalization for the data receiving signal.

4. The adaptive equalization circuit according to claim 1, wherein said adaptive equalization control unit includes a logic circuit and said monitor unit comprises an analog/digital converter.

5. The adaptive equalization circuit according to claim 1, further comprising
a plurality of monitor result hold units for temporarily holding respective results of monitoring by said monitor unit, wherein said operation control unit comprises a switch unit for giving data held by all of the plurality of monitor result hold units to said adaptive equalization control unit.

6. An adaptive equalization circuit equipped by an adaptive equalization control unit for controlling an equalizer circuit which equalizes an equalization object signal, comprising:
a plurality of storage units for storing input values for a plurality of gain amplifiers;
an identity detection unit for detecting an identity between the preset data pattern and a data pattern output from the equalizer circuit;
a subtracter for subtracting the output the identify circuit from a predicted amplitude;
a selector for selecting one of an output the identify detection unit and an output of the subtracter;
an operation control unit for making the adaptive equalization control unit operate an adaptive equalization control based on a content of the plurality of storage units and an output of the subtracter.

7. The adaptive equalization circuit according to claim 6, wherein said preset data pattern and a length thereof are variable.

8. The adaptive equalization circuit according to claim 6, wherein said equalization object signal is a data receiving signal transmitted by a data transmitter and said adaptive equalization circuit carries out an adaptive equalization for the data receiving signal.

9. The adaptive equalization circuit according to claim 6, wherein said adaptive equalization control unit includes a logic circuit, and said plurality of storage units stores digital values of inputs to gain amplifiers.

10. The adaptive equalization circuit according to claim 1, further comprising:
a second analog/digital inverter which receives the output of the equalizer circuit.

11. An adaptive equalization circuit equipped by an adaptive equalization control unit for controlling an equalizer circuit which equalizes an equalization object signal, comprising:
an identity detection unit for detecting an identity between a preset data pattern and a data pattern output from the equalizer circuit;
a monitor unit for sequentially monitoring an output of the equalizer circuit and inputs to a plurality of gain amplifiers included by the equalizer circuit, every time the identity detection unit detects the identity between the preset data pattern and the data pattern; and
an operation control unit for making the adaptive equalization control unit operate an adaptive equalization control by providing the adaptive equalization control unit with the result of monitoring,
wherein the monitor unit circuit includes a selector which selects one of the output of the equalizer circuit and the inputs to the plurality of gain amplifiers, and a analog/digital converter which receives the selected one.

12. The adaptive equalization circuit according to claim 11, wherein the operation control unit includes a analog/digital control circuit which supplies a selection signal to the selector.

13. The adaptive equalization circuit according to claim 11, further comprising:
a hold circuit, coupled to the selector, for holding the output of the equalizer circuit and the inputs to the plurality of gain amplifiers.

* * * * *